(12) United States Patent
Kim et al.

(10) Patent No.: US 8,321,536 B2
(45) Date of Patent: Nov. 27, 2012

(54) METHOD AND APPARATUS FOR PROCESSING REMOTE CONTROL KEY DATA IN HOME NETWORK DEVICE

(75) Inventors: Yong-jun Kim, Yongin-si (KR);
Jae-kwon Kim, Suwon-si (KR);
Bong-yen Kim, Seongnam-si (KR);
Eun-jung Kang, Suwon-si (KR);
Dong-wook Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1181 days.

(21) Appl. No.: 11/593,563

(22) Filed: Nov. 7, 2006

(65) Prior Publication Data

US 2008/0209008 A1 Aug. 28, 2008

Related U.S. Application Data (60) Provisional application No. 60/733,800, filed on Nov. 7, 2005.

(30) Foreign Application Priority Data

Jan. 27, 2006 (KR) .................. 10-2006-0009069

(51) Int. Cl.
*G06F 15/16* (2006.01)
*G06F 15/173* (2006.01)
*G06F 9/44* (2006.01)
*G06Q 30/00* (2012.01)

(52) U.S. Cl. ........... 709/220; 709/223; 705/26; 717/124

(58) Field of Classification Search ........... 709/220–225
See application file for complete search history.

(56) References Cited

U.S. PATENT DOCUMENTS

| | | | |
|---|---|---|---|
| 7,395,261 B1 * | 7/2008 | Atzel ........................... | 707/5 |
| 2002/0082929 A1 * | 6/2002 | Wang et al. ..................... | 705/26 |
| 2003/0131089 A1 * | 7/2003 | Yamamoto et al. .......... | 709/223 |
| 2004/0210872 A1 * | 10/2004 | Dorr et al. ..................... | 717/124 |
| 2004/0249925 A1 * | 12/2004 | Jeon et al. .................... | 709/223 |
| 2004/0268256 A1 * | 12/2004 | Furuta et al. ................. | 715/531 |
| 2005/0074028 A1 * | 4/2005 | Wugofski et al. ............ | 370/468 |

FOREIGN PATENT DOCUMENTS

| | | | |
|---|---|---|---|
| JP | 2000010714 A | * | 1/2000 |
| JP | 2003271336 A | * | 9/2003 |

OTHER PUBLICATIONS

L. Peter Deutsch; Engineering Broad-Spectrum Document Software: Lessons from Ghostscript; 2002; ACM, 1-58113-594-7/02/0011; 1.*

* cited by examiner

*Primary Examiner* — Ashok Patel
*Assistant Examiner* — Evans Desrosiers
(74) *Attorney, Agent, or Firm* — Sughrue Mion, PLLC (57) ABSTRACT

Provided are a method and apparatus for receiving remote control key data in a home network and requesting a server to perform an operation corresponding to the remote control key data. The method includes converting the remote control key data to a code which can be referred to in a web document received from the server, determining an operation corresponding to the code by referring to the web document, and requesting the server to perform the determined operation. Accordingly, even when an item corresponding to a function supported by the server is not displayed on a menu screen, a user receiving a service from the server using a client device in the home network can use the function by instinctively pressing a remote control key corresponding to the function.

9 Claims, 7 Drawing Sheets

| REMOTE CONTROL KEY | DESCRIPTION | CODE |
|---|---|---|
| 0~9 | NUMERIC KEYS | 0xA0 ~ 0xA9 |
| UP & DOWN | UP AND DOWN | 0xAA, 0xAB |
| LEFT & RIGHT | LEFT AND RIGHT | 0xAC, 0xAD |
| POWER | POWER | 0xAE |
| MUTE | MUTE | 0xAF |
| CHANNEL_UP & DOWN | CHANNEL UP/DOWN | 0xB0, 0xB1 |
| VOLUME_UP & DOWN | VOLUME UP/DOWN | 0xB2, 0xB3 |
| ENTER | SELECTION | 0xB4 |
| MENU | MENU | 0xB5 |
| EXIT | END | 0xB6 |
| SOURCE | CHANGE OF SOURCE | 0xB7 |
| GUIDE | BROADCASTING GUIDANCE | 0xB8 |
| PREV. CHANNEL | PREVIOUS CHANNEL | 0xB9 |
| REW/STOP/PLAY/PAUSE/FF | KEYS RELATED TO PLAY | 0xBA~0xBE |
| EJECT | EJECT | 0xBF |
| COLOR0~4 | COLOR KEYS | 0xC0~0xC4 |
| INFO | INFORMATION DISPLAY | 0xC5 |
| ... | OTHER | |
| ... | OTHER | |

FIG. 5A

```
<HTML>
<EMBED TYPE="application/kyj" NAME="kyj">
<SCRIPT LANGUAGE="JavaScript">
document.captureEvents(Event.KEYPRESS);
document.onKeyPress = keypress_handler;

function keypress_handler(e) {
  if (e.modifiers & Event.RCU_MASK)
  {
    if ((e.which >= 0xAA && e.which <= 0xAD) || e.which == 0xB4)
      return true;
    else if (e.which >= 0xB0 && e.which <= 0xB3)
    {
      document.kyj.sendEvent(e.which);
      return false;
    }
    else
      return script_handler(e);
  }
  return true;
}
function script_handler(e) {
  if (e.which == 0xBC)
    document.location = "play.htm";
  else if (e.which == 0xBB)
    document.location"stop.htm";
  else if (e.which == 0xBE)
    document.location = "ff.htm";
  else if (e.which == 0xBA)
    document.location = "rew.htm";
  else
    return true;
  return false;
}
</SCRIPT>
<A HREF="play.htm">Play</A>
<A HREF="stop.htm">Stop</A>
<A HREF="ff.htm">FF</A>
<A HREF="rew.htm">REW</A>
</HTML>
```

FIG. 5B

```
<HTML>
<SCRIPT LANGUAGE="JavaScript">
document.captureEvents(Event.KEYPRESS);
document.onKeyPress = keypress_handler;

function keypress_handler(e) {
    if (e.modifiers & Event.RCU_MASK)
    {
        if ((e.which >= 0xAA && e.which <= 0xAD) || e.which == 0xB4)
            return true;
        else if (e.which >= 0xB0 && e.which <= 0xB3)
        {
            if (window.RemoteObject)
            {
                var kyj = new RemoteObject();
                kyj.sendEvent(e.which);
                return false;
            }
            else
                return true;
        }
        else
            return script_handler(e);
    }
    return true;
}
```

FIG. 7

| Sync Byte | Command | Key Code | Continuous/Ack Flag |
|---|---|---|---|
| 1 Byte (0xFF) | 1 Byte | 1 Byte | 1 Byte |

FIG. 8A

| Sync Byte | Command | Key Code | Continuous/Ack Flag |
|---|---|---|---|
| 0xFF | 0x01 | 0xBC | 0x01 |

FIG. 8B

| Sync Byte | Command | Key Code | Continuous/Ack Flag |
|---|---|---|---|
| 0xFF | 0x11 | 0xBC | 0x01 |

METHOD AND APPARATUS FOR PROCESSING REMOTE CONTROL KEY DATA IN HOME NETWORK DEVICE

CROSS-REFERENCE TO RELATED APPLICATIONS

This application claims the benefit of Korean Patent Application No. 10-2006-0009069, filed on Jan. 27, 2006, in the Korean Intellectual Property Office, and the benefit of U.S. Provisional Patent Application No. 60/733,800, filed on Nov. 7, 2005, in the U.S. Patent and Trademark Office, the disclosures of which are incorporated herein in their entirety by reference.

BACKGROUND OF THE INVENTION

1. Field of the Invention

The present invention relates to a method of processing remote control key data, and more particularly, to a method and apparatus for processing data, corresponding to a remote control key selected by a user, in a home network device.

2. Description of the Related Art

Vigorous research and standardization regarding a home network have realized an environment in which a user can operate various home network devices using a single remote control. For example, in a home network environment, a user can receive digital content from various home network devices, such as a personal computer (PC) or a digital versatile/video disc (DVD) player, through a television (TV), and appreciate the received digital content.

Figure 1:
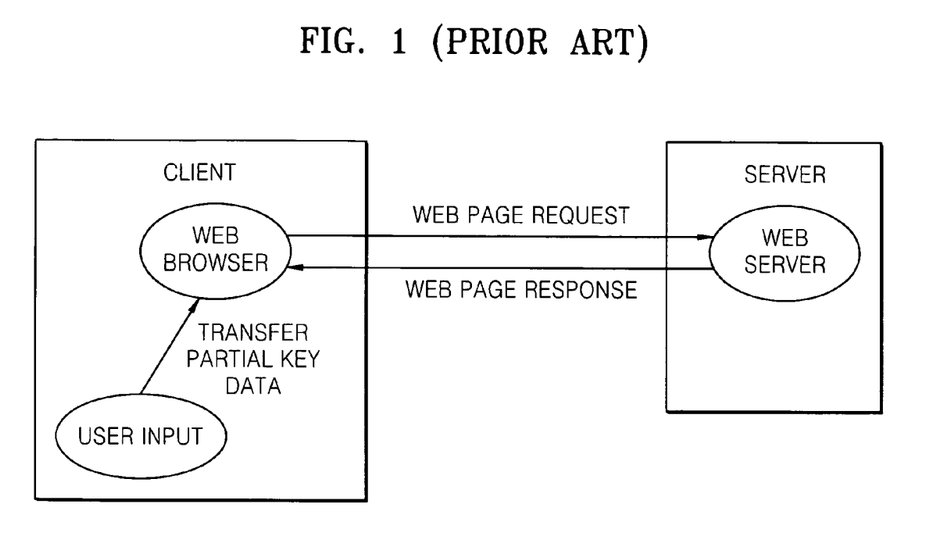
FIG. 1 is a schematic diagram for explaining a general method of processing remote control key data in a home network device.

FIG. 1 is a schematic diagram for explaining a general method of processing remote control key data in a home network device. Referring to FIG. 1, the home network device can be classified, in terms of function, into a server providing a service and a client receiving the service. For example, if a user reproduces a moving picture stored in a PC having a web server function using a TV, the TV is a client, and the PC is a server.

If a user accesses a Uniform Resource Locator (URL) of the server by executing a web browser in the client, the web browser accesses a web server in the server, and the web server transmits a web page to the client. When the client receives the web page and displays the received web page on a screen, the user calls a function included in the web server by selecting an item displayed in a menu of the web page using a remote control, and the web server provides a service of the server to the client by transmitting a function call response to the client.

According to prior art, since the user requests the server for a service by selecting an item of a web page displayed on the screen of the client, even though a service provided by the server exists, the user cannot use a certain service, unless the service is displayed as an item in the web page.

In addition, since keys of the remote control are not adaptive to any of the web pages, the user should use in general only limited keys (hereinafter, search keys), such as direction keys and an enter key, in order to select an item displayed in the web page, resulting in inconvenience as the search keys must be operated several times.

SUMMARY OF THE INVENTION

The present invention provides a method and apparatus for receiving key input data of a remote control so as to request that an operation not be displayed as an item in a web page and for requesting a server for the operation.

The present invention also provides a method and apparatus for selecting an item displayed in a web page using a shortcut key.

According to an aspect of the present invention, there is provided a method of processing remote control key data input by a user in a home network, the method including: converting the remote control key data to a code which can be referred to in a web document received from a server; determining an operation corresponding to the code by referring to the web document; and requesting the server to perform the determined operation.

The requesting may include transmitting the code to the server if a menu item for requesting a web server installed in the server to perform the operation does not exist in the web document. The requesting may also include performing the same procedure as that of a case where a remote control key for selecting a menu item is selected if the menu item for requesting a web server installed in the server to perform the operation exists in the web document.

According to another aspect of the present invention, there is provided a computer readable recording medium storing programs for executing the remote control key data processing method.

According to another aspect of the present invention, there is provided a client apparatus for processing remote control key data input by a user in a home network, the client apparatus including: a converter converting the remote control key data to a code which can be referred to in a web document received from a server; a decision unit determining an operation corresponding to the code by referring to the web document; and a requesting unit requesting the server to perform the determined operation.

The requesting unit may transmit the code to the server through a predetermined plug-in module designated by the web document if a menu item for requesting a web server installed in the server to perform the operation does not exist in the web document. The requesting unit may also perform the same procedure as that of a case where a remote control key for selecting a menu item is selected if the menu item for requesting a web server installed in the server to perform the operation exists in the web document.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

The present invention will now be described more fully with reference to the accompanying drawings, in which exemplary embodiments of the invention are shown.

Figure 2:
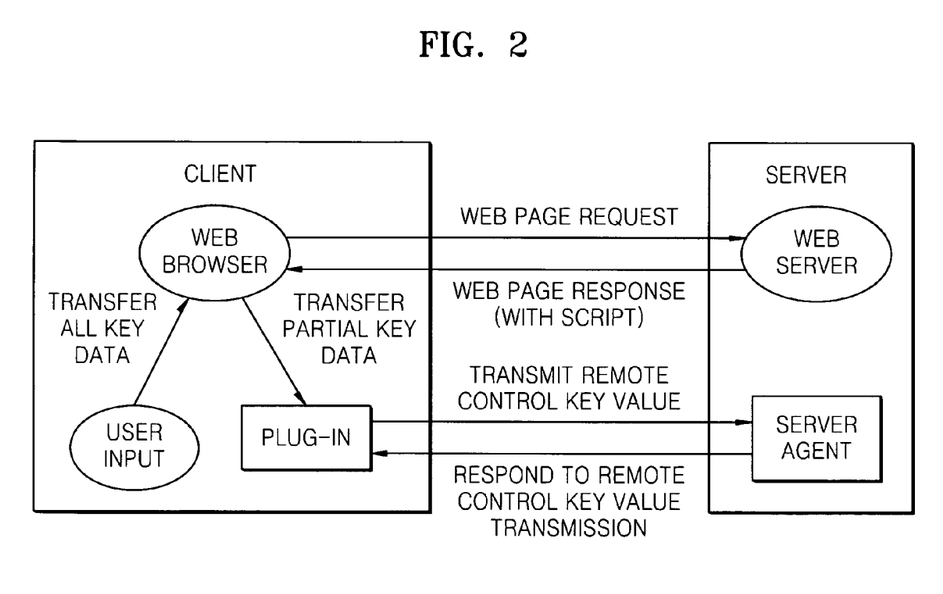
FIG. 2 is a schematic diagram for explaining a method of processing remote control key data in a home network device according to an embodiment of the present invention.

FIG. 2 is a schematic diagram for explaining a method of processing remote control key data in a home network device according to an embodiment of the present invention.

Referring to FIG. 2, a user can use search keys and other keys included in a remote control to select an item displayed in a web page. A web browser of a client analyzes remote control key data input by the user, and if the input remote control key data is for requesting a web server for a specific web page, the web browser requests the web server for the specific web page, and if that which is being requested is not specified because a menu item corresponding to the input remote control key data does not exist in the web page, the web browser transmits a value corresponding to the input remote control key data to a server agent installed in the server by means of a separate plug-in module so that the server directly analyzes that which is being requested.

A plug-in module is a program for executing various types of data by being connected to a web browser and expressing the execution result in order to additionally support functions not supported by the web browser, is easily installed and used as a portion of the web browser, is automatically recognized by the web browser, is integrated in a hyper text markup language (HTML) file, and has the same effect as if the data is directly executed by the web browser. In the current embodiment, the plug-in module is a program for transmitting a remote control key value to the server, and the server agent is a program executed in the server in response to the plug-in module and performs a function of responding to a request of the plug-in module. Herein, a process of converting the input remote control key data to a server readable value must first be performed, and the conversion process will be described below.

Figure 3:
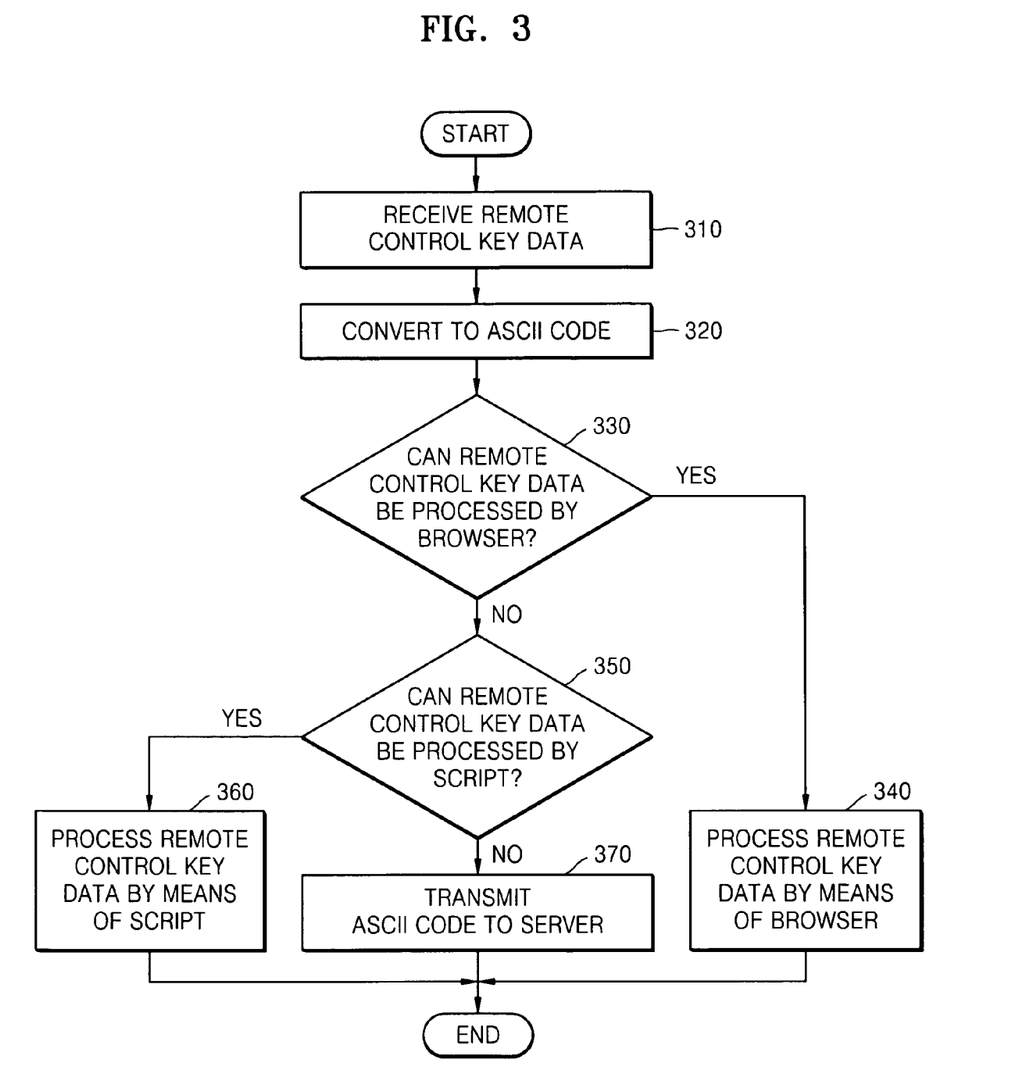
FIG. 3 is a flowchart illustrating the processing of remote control key data in a client apparatus of a home network according to an embodiment of the present invention.

FIG. 3 is a flowchart illustrating the processing of remote control key data in a client apparatus of a home network according to an embodiment of the present invention.

Figure 4:
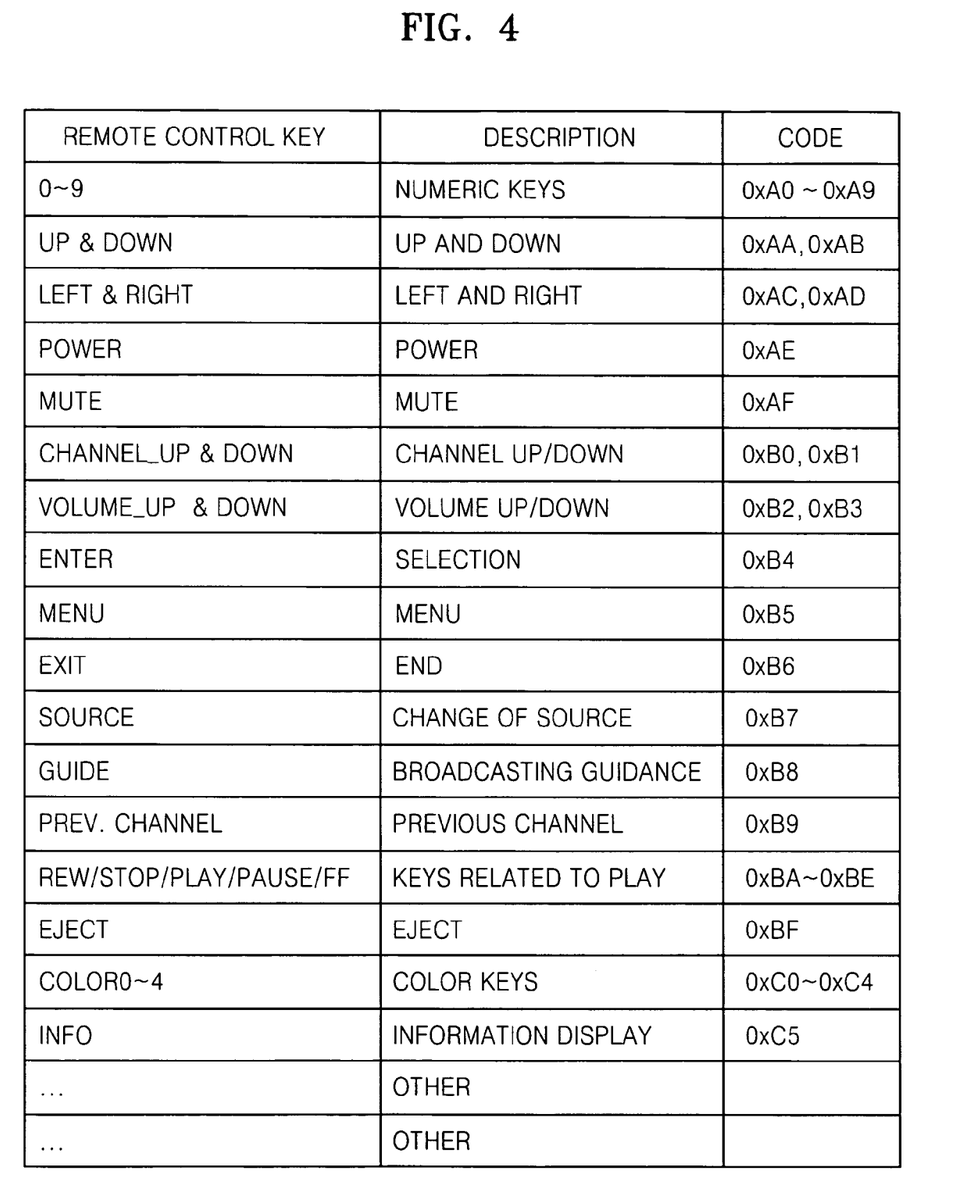
FIG. 4 is a table in which remote control keys are mapped to American Standard Code for Information Interchange (ASCII) codes, according to an embodiment of the present invention.

Referring to FIG. 3, if a user selects a remote control key while viewing a web page displayed on a screen in operation 310, the client converts data of the selected remote control key to a code which can be referred to in a web document received from a server, for example an American Standard Code for Information Interchange (ASCII) code in the current embodiment, in operation 320 so that a script to be used for analysis of the remote control key data can handle the remote control key data. Herein, mapping information in a table as illustrated in FIG. 4 is referred to. Then, the client determines an operation corresponding to the code by referring to the web document. Referring to FIG. 3, the client determines in operation 330 whether the remote control key data can be processed by a web browser by referring to the mapping information in the table illustrated in FIG. 4. For example, a remote control key which can be processed by the web browser is a search key such as a direction key or an enter key. If it is determined in operation 330 that the remote control key data can be processed by the web browser, the web browser performs an operation corresponding to the remote control key in operation 340. If it is determined in operation 330 that the remote control key data cannot be processed by the web browser, the client determines in operation 350 whether the remote control key data can be processed by a script designated by the web page. If it is determined in operation 350 that the remote control key data can be processed by the script, the client requests a server for the operation corresponding to the remote control key using the script in operation 360. Herein, the script denotes, in general, a script language executed by a web browser, and examples of the script are Java Script and J-Script but the script is not limited to a specific type.

Data of a remote control key can be processed by a script when a menu item for requesting a web server for an operation corresponding to the remote control key exists in a web page displayed on a current screen as described above. In this case, since information regarding a requested object is clearly specified in a web document forming the current screen, a script is designed to request the web server for the requested object.

If it is determined in operation 350 that the remote control key data cannot be processed by the script, the client transmits the remote control key value (ASCII code) to the server using a plug-in module in operation 370, which will be described in detail below referring to FIG. 5A. If a required plug-in module is not installed in the client, a predetermined plug-in module designated in the web document is downloaded from the outside. Alternatively, the client may transmit the remote control key value (ASCII code) to the server using an embedded object installed in a web browser, which will be described in detail below referring to FIG. 5B.

FIG. 4 is a table in which remote control keys are mapped to ASCII codes, according to an embodiment of the present invention.

When a user selects a key of a remote control, a client analyzes data corresponding to the selected remote control key. The remote control key data is analyzed by a script designated by a web page displayed on a current screen, and since an ASCII code mapped to the remote control key does not exist, a web browser must convert the remote control key data to ASCII code by referring to the table illustrated in FIG. 4 and transmit the converted ASCII code to the script. However, since the script should understand the received ASCII code as the remote control key data, the web browser may add attribute information indicating that the ASCII code transmitted to the script is remote control key data.

Since a plug-in module may transmit a value, which is converted from remote control key data, to a server, the server must also have the table illustrated in FIG. 4 in order to analyze the remote control key data.

Figure 5A:
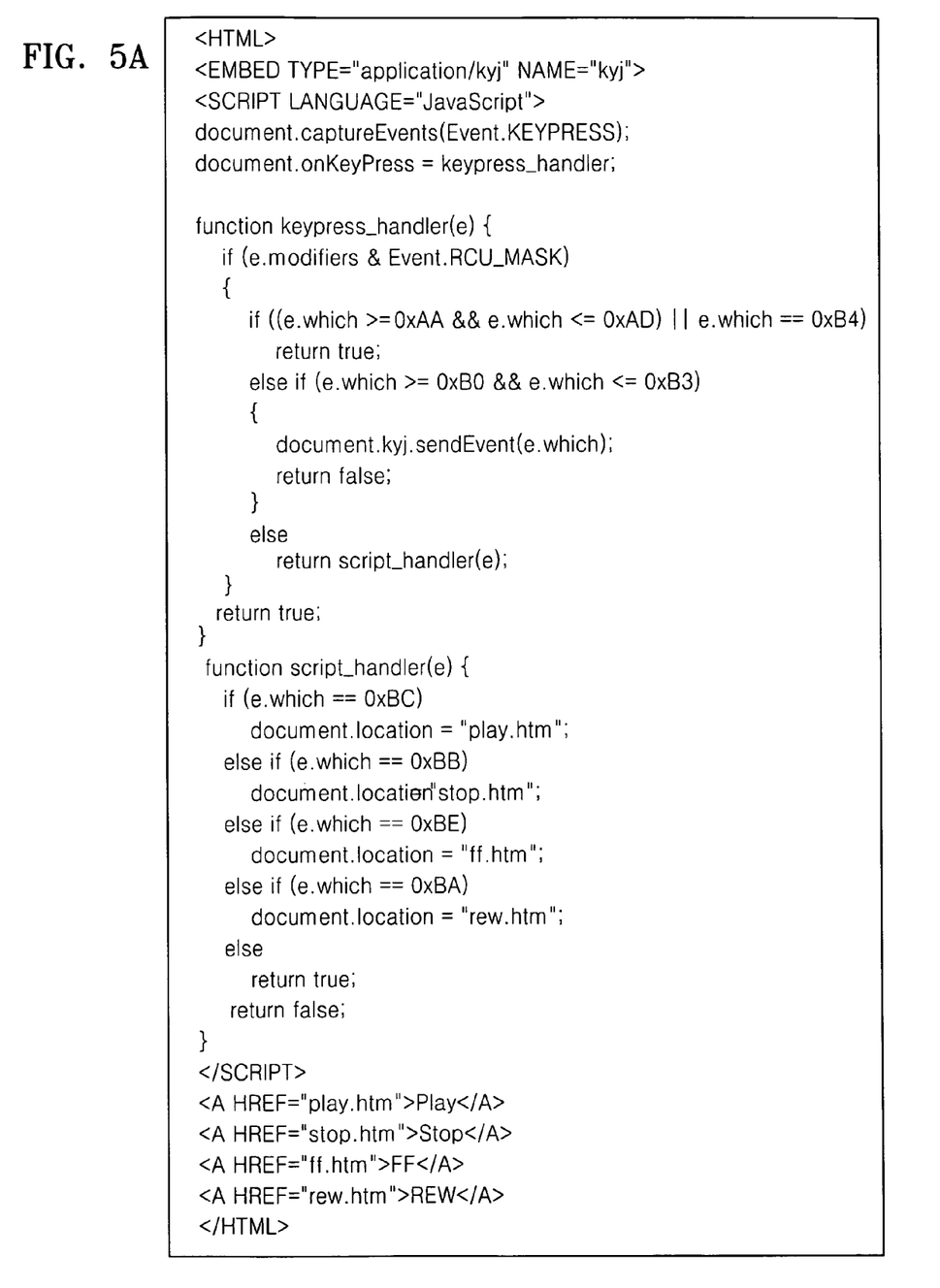
FIGS. 5A and 5B are portions of web documents provided from a server to a client according to an embodiment of the present invention.
Figure 5B:
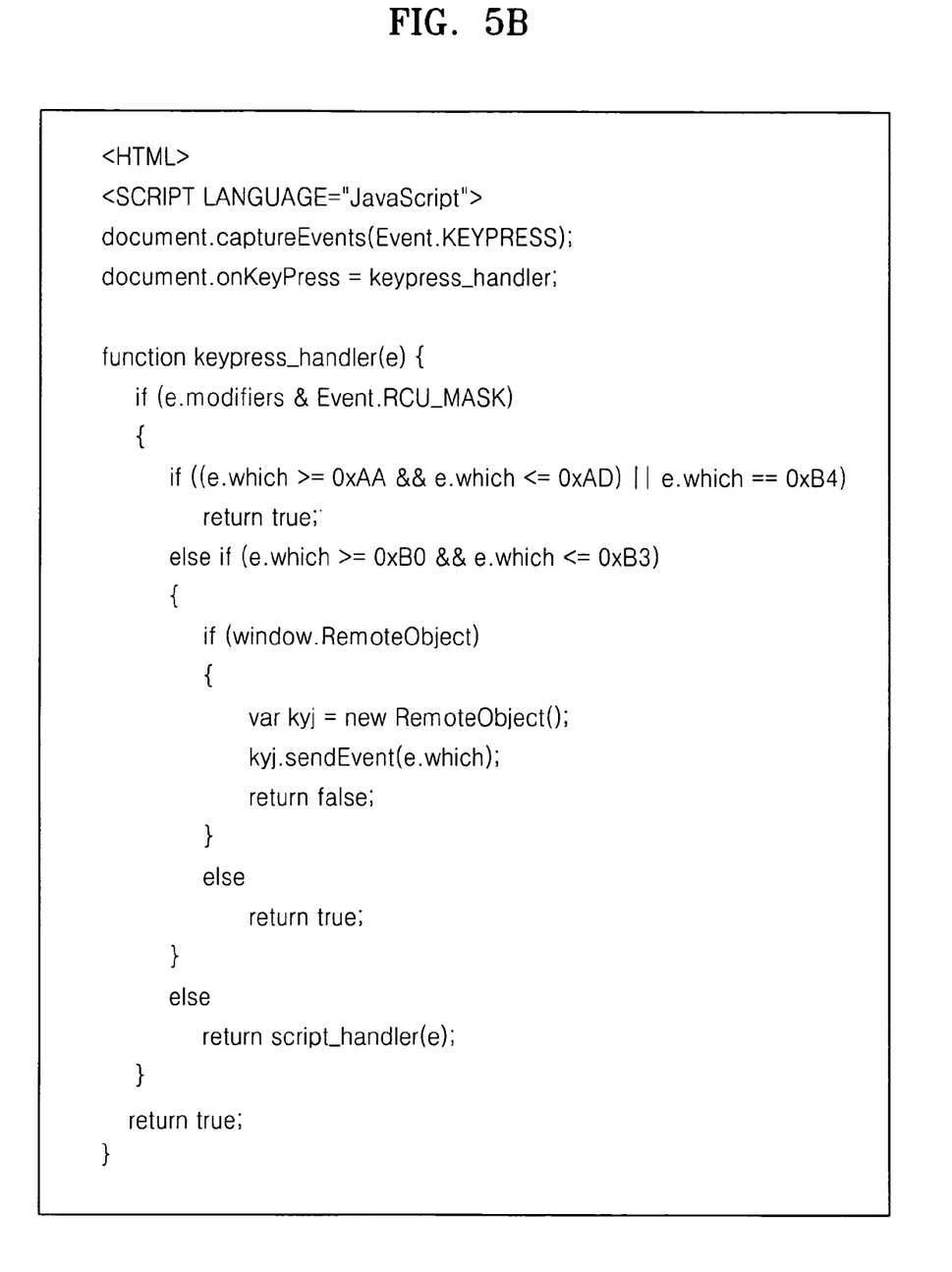

FIGS. 5A and 5B show portions of web documents provided from a server to a client according to an embodiment of the present invention.

When the client accesses a web server of a home network device using a web browser, the web server transmits the web document illustrated in FIG. 5A or 5B to the client, and the client, e.g., a digital TV, forms a screen based on the received web document. Accordingly, a user selects a key of a remote control while seeing the screen (hereinafter, a menu screen) formed using the web document. The web documents illustrated in FIGS. 5A and 5B will now be described in more detail.

FIG. 5A illustrates a case where the client transmits a remote control key value to the server using a plug-in module.

The web browser of the client detects '<EMBED TYPE="application/kyj"NAME="kyj">' and executes a plug-in module having the name "kyj". If the plug-in module having the name "kyj" is not installed in the web browser, the web browser downloads the plug-in module from a Uniform Resource Locator (URL) (not shown) in an HTML tag and installs the downloaded plug-in module.

If a key of a remote control is selected, an event object 'e' corresponding to the selected remote control key is processed by a function 'keypress_handler( )'. If a 'which' field of the event object 'e', i.e., an ASCII code corresponding to the selected remote control key, can be processed by the web browser like a search key, the web browser returns '<true>' so that the web browser processes data of the selected remote control key. If the selected remote control key corresponds to a specific value defined by the server, the web browser transmits the remote control key value to the server using a 'sendEvent( )' method of the "kyj" plug-in module. The 'sendEvent ( )' method is used when the server supports a service corresponding to the selected remote control key even though a menu item corresponding to the selected remote control key is not provided by a menu web document.

Another case is where a function 'script_handler( )' is used for processing a shortcut key. That is, as shown in the bottom of the web document illustrated in FIG. 5A, if a user selects a '<Play>' item by placing a cursor on the '<Play>' item of the menu screen using a direction key of the remote control and pressing an enter key, the web browser requests a web server of the server for a document 'play.htm'. However, if the user presses a '<play>' key of the remote control in a state where the cursor does not place on the '<Play>' item, the function 'script_handler( )' analyzes an ASCII code corresponding to the selected remote control key and requests the web server for the document 'play.htm'. Thus, if a key having the same function as a menu item provided on the menu screen, which is determined with the instinctive thought of the user, exists in the remote control, the user can use the key as a shortcut key. To do this, a script must be designed so that the web browser performs an operation corresponding to a remote control key assigned as a shortcut key.

FIG. 5B illustrates a case where the client transmits a remote control key value to the server using an embedded object installed in the web browser instead of using a plug-in module. Referring to FIG. 5B, when a selected remote control key corresponds to an ASCII code to be transmitted to the server, the client transmits the ASCII code to the server using an embedded object 'RemoteObject( )' instead of the plug-in module of FIG. 5A, and the role of the embedded object 'RemoteObject( )' is to transmit the ASCII code to an agent of the server as the plug-in module of FIG. 5A. However, the embedded object 'RemoteObject( )' must be previously installed in the web browser.

Figure 6:
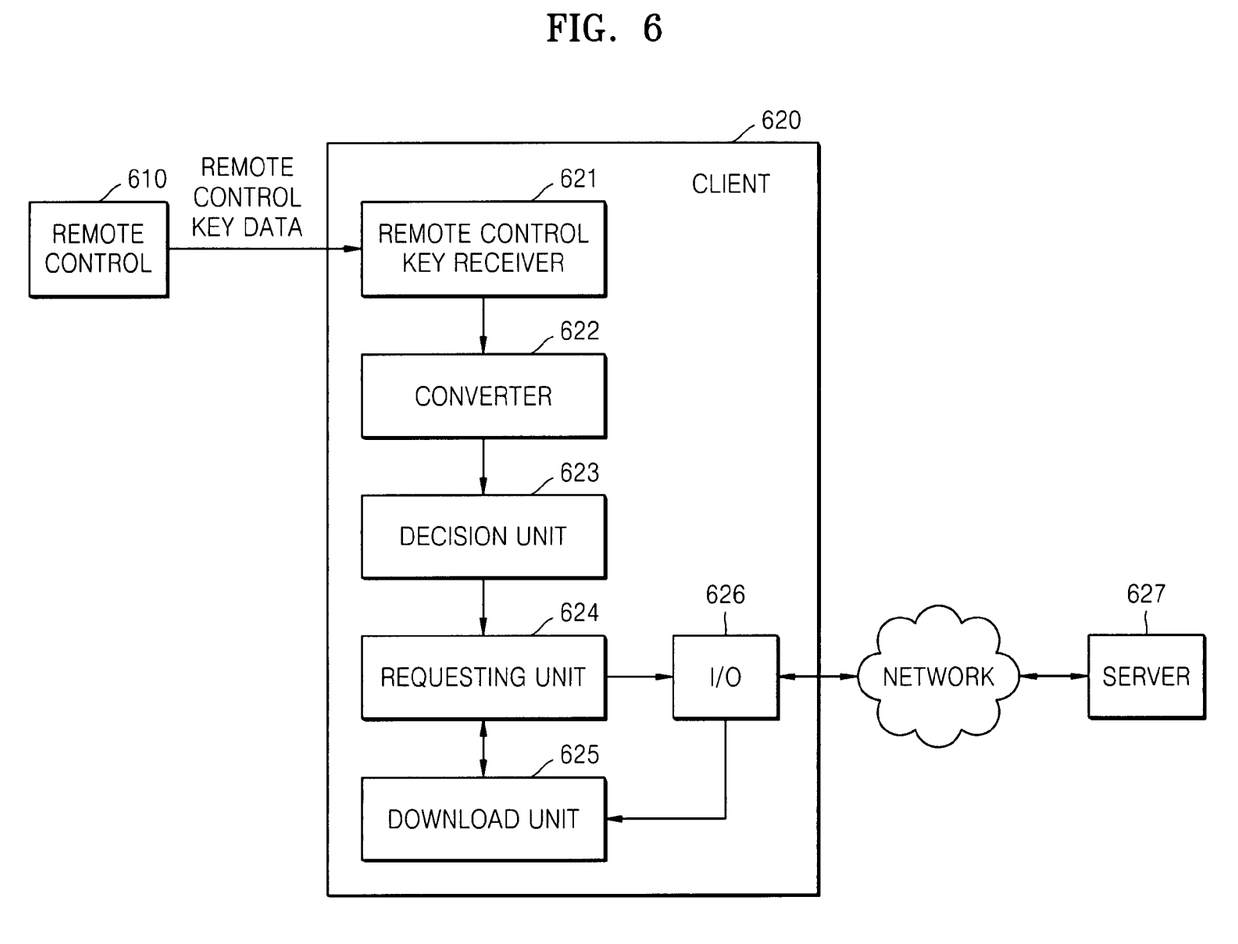
FIG. 6 is a block diagram of a client apparatus according to an embodiment of the present invention.

FIG. 6 is a block diagram of a client apparatus 620 according to an embodiment of the present invention.

Referring to FIG. 6, the client apparatus 620 includes a remote control key receiver 621, a converter 622, a decision unit 623, a requesting unit 624, a download unit 625, and an input/output (I/O) interface 626.

The remote control key receiver 621 receives remote control key data input by a user from a remote control 610, and the converter 622 converts the received remote control key data to ASCII code by referring to the table illustrated in FIG. 4. The decision unit 623 analyzes the converted ASCII code and determines what operation corresponds to the converted ASCII code referring to the web document, and the requesting unit 624 requests a server 627 through the I/O interface 626 for the operation determined by the decision unit 623.

If an operation that is to be requested can be requested from a web server by using a script, the requesting unit 624 processes remote control key data using the script, and if the operation that is to be requested cannot be requested from the web server by using a script, the requesting unit 624 transmits a converted ASCII code to the server 627 using a plug-in module assigned in a web document forming a menu screen. If a required plug-in module is not installed in the client apparatus 620, the download unit 625 downloads a predetermined plug-in module designated in the web document by referring to the web document. As described above, the operation that is to be requested can be requested from the web server when a menu item for requesting the operation is provided by the web document.

Figure 7:
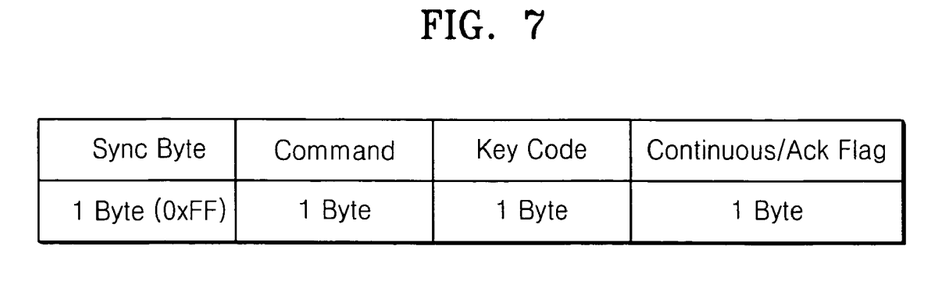
FIG. 7 illustrates a structure of a packet transmitted and received between a server and a client according to an embodiment of the present invention.
Figure 8A:
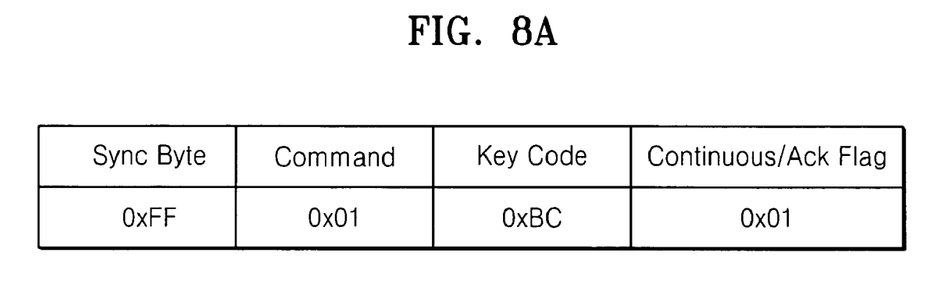
FIGS. 8A and 8B are examples of the packet illustrated in FIG. 7.
Figure 8B:
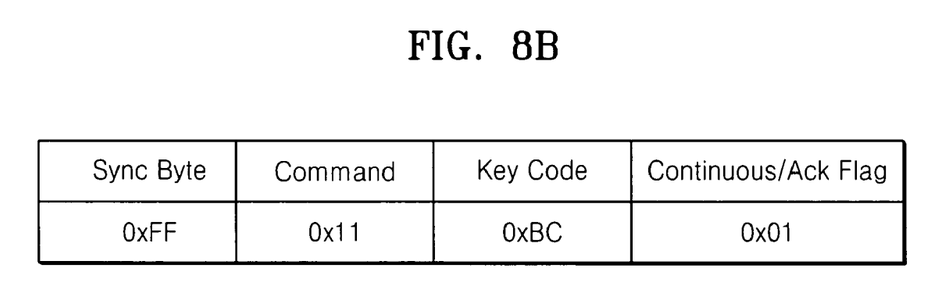

FIG. 7 illustrates a structure of a packet transmitted and received between a server and a client according to an embodiment of the present invention. FIGS. 8A and 8B are examples of the packet illustrated in FIG. 7.

Referring to FIGS. 7 to 8B, the packet includes a one-byte sync byte field, a one-byte command field, a one-byte key code field, and a one-byte continuous/ACK flag field. The sync byte field is a field for indicating a start point of the packet and is fixed to '0×FF'. The command field is a field for identifying a packet type. For example, the command field can be set to '0×01' to indicate a packet for transmitting remote control key data to the server or '0×11' to indicate a packet for responding to the transmitted remote control key data.

The key code field is a field for indicating which key of a remote control is selected, and as described above, ASCII code corresponding to a remote control key selected by a user is stored in the key code field.

The continuous/ACK flag field can be used for indicating whether a remote control key is continuously selected when the command field indicates a packet for transmitting remote control key data, i.e., when a value of the command field is '0×01'. For example, the continuous/ACK flag field can be set to '0×01' when a remote control key is selected once and '0×02' when a remote control key is selected continuously. When a value of the command field is '0×11', i.e., when the command field indicates a response packet, the continuous/ACK flag field can indicate information about an execution result. For example, the continuous/ACK flag field can be set to '0×01' for success and '0×02' for failure.

FIG. 8A illustrates a structure of a packet transmitted from the client to the server when the user selects a 'play' key of the remote control once. Thus, '0×BC' stored in the key code field is an ASCII code corresponding to the 'play' key of the remote control. FIG. 8B illustrates a structure of a packet transmitted from the server to the client in response to the packet of FIG. 8A. Since the packet illustrated in FIG. 8B is a response packet, the value of the command field is '0×11' which is different from FIG. 8A, and since the value of the continuous/ACK flag field is '0×01', it can be determined that the packet of FIG. 8A has been successfully transmitted to the server.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, according to the present invention, even when an item corresponding to a function supported by a server is not displayed on a menu screen, a user receiving a service from the server using a client device in a home network can use the function by instinctively pressing a remote control key corresponding to the function.

In addition, when a desired item exists on the menu screen, the user also can select the item by pressing a remote control key instinctively recognized as a key for performing the same function as the item without having to press a direction key several times.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for a client to process remote control key data input by a user in a home network, the method comprising:
   converting the remote control key data to an American Standard Code for Information Interchange (ASCII) code understandable by a predetermined script included in the web Document; that is mapped to a selected remote control key;
   searching for a menu item which corresponds to the code,
   in a web document received from a server and for requesting a web server installed in the server to perform one or more operations; and
   transmitting the code to the server to request the server to perform the operation corresponding to the code when the menu item which corresponds to the code does not exist in the web document and when the menu item which corresponds to the code exists in the web document, performing the same procedure as that of a case where a remote control key for selecting the menu item is input comprising selecting an operation corresponding to the ASCII code by executing the script.

2. The method of claim 1, further comprising transmitting the code to the server using a plug-in module.

3. The method of claim 2, further comprising, when the plug-in module is not installed in a client, downloading a predetermined plug-in module designated in the web document from the outside.

4. The method of claim 1, further comprising transmitting the code to the server using an embedded object installed in a web browser.

5. A non-transitory computer readable recording medium storing programs for executing the method of claim 1.

6. A client apparatus for processing remote control key data input by a user in a home network, the client apparatus comprising:
   a converter converting the remote control key data to an American Standard Code for Information Interchange (ASCII) code understandable by a predetermined script included in the web Document; that is mapped to a selected remote control key;
   a decision device searching for a menu item which corresponds to the code, in a web document received from a server and for requesting a web server installed in the server to perform one or more operations; and
   a requesting device transmitting the code to the server to request the server to perform the operation corresponding to the code when the menu item which corresponds to the code does not exist in the web document and when the menu item which corresponds to the code exists in the web document, performing the same procedure as that of a case where a remote control key for selecting the menu item is input comprising selecting an operation corresponding to the ASCII code by executing the script.

7. The client apparatus of claim 6, wherein the requesting device transmits the code to the server using a plug-in module.

8. The client apparatus of claim 7, further comprising, when the plug-in module is not installed in the client apparatus, a download unit downloading a predetermined plug-in module designated in the web document by referring to the web document.

9. The client apparatus of claim 6, wherein the requesting device transmits the code to the server using an embedded object installed in a web browser.

* * * * *